June 27, 1939. H. W. HOW 2,163,600
SEPARATOR
Filed Nov. 24, 1937 3 Sheets-Sheet 1
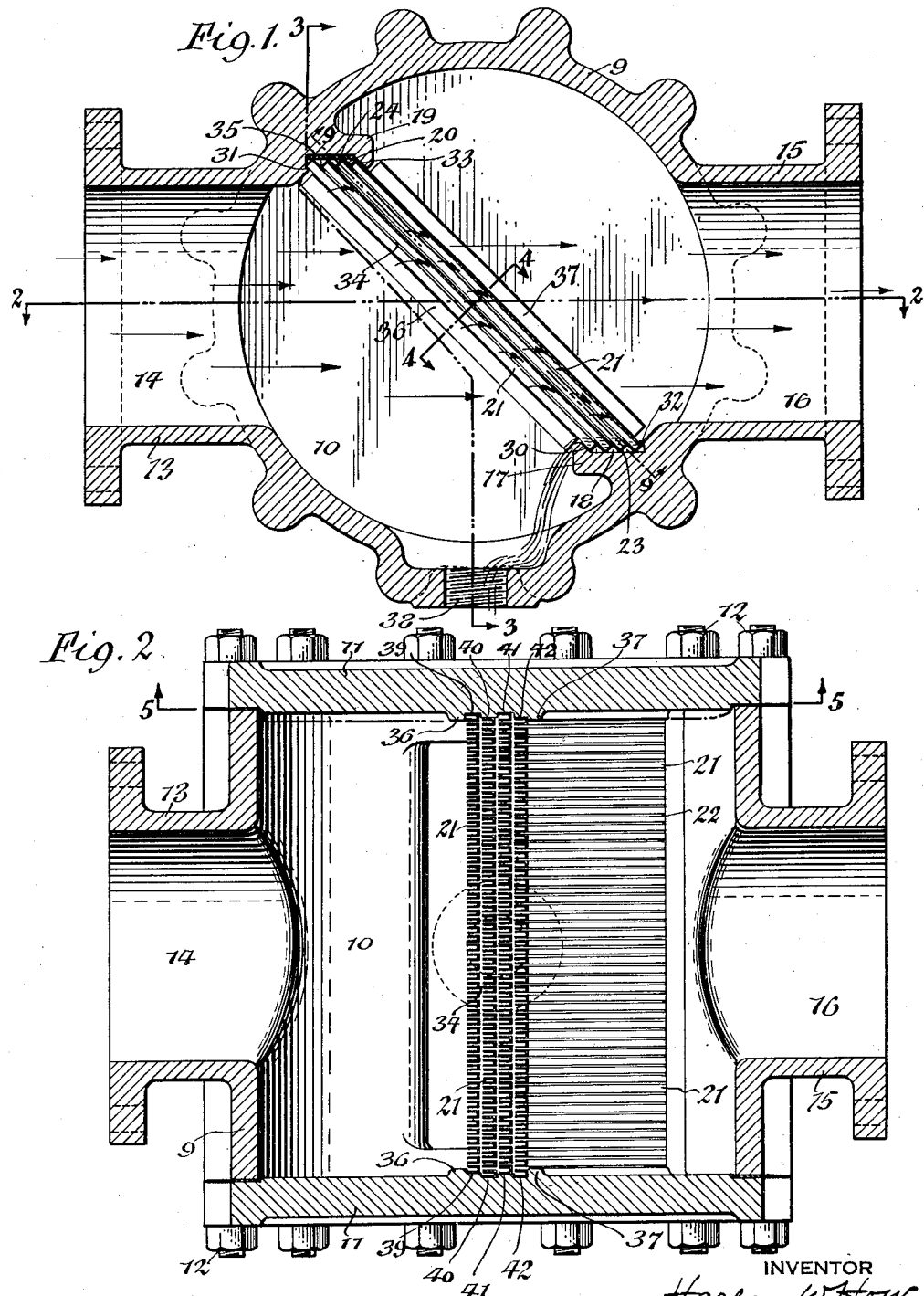
INVENTOR
Harlan W. How
BY Potter Potter
ATTORNEYS.

June 27, 1939.  H. W. HOW  2,163,600
SEPARATOR
Filed Nov. 24, 1937  3 Sheets-Sheet 2

INVENTOR
Harlan W. How
BY Popp & Popp
ATTORNEYS

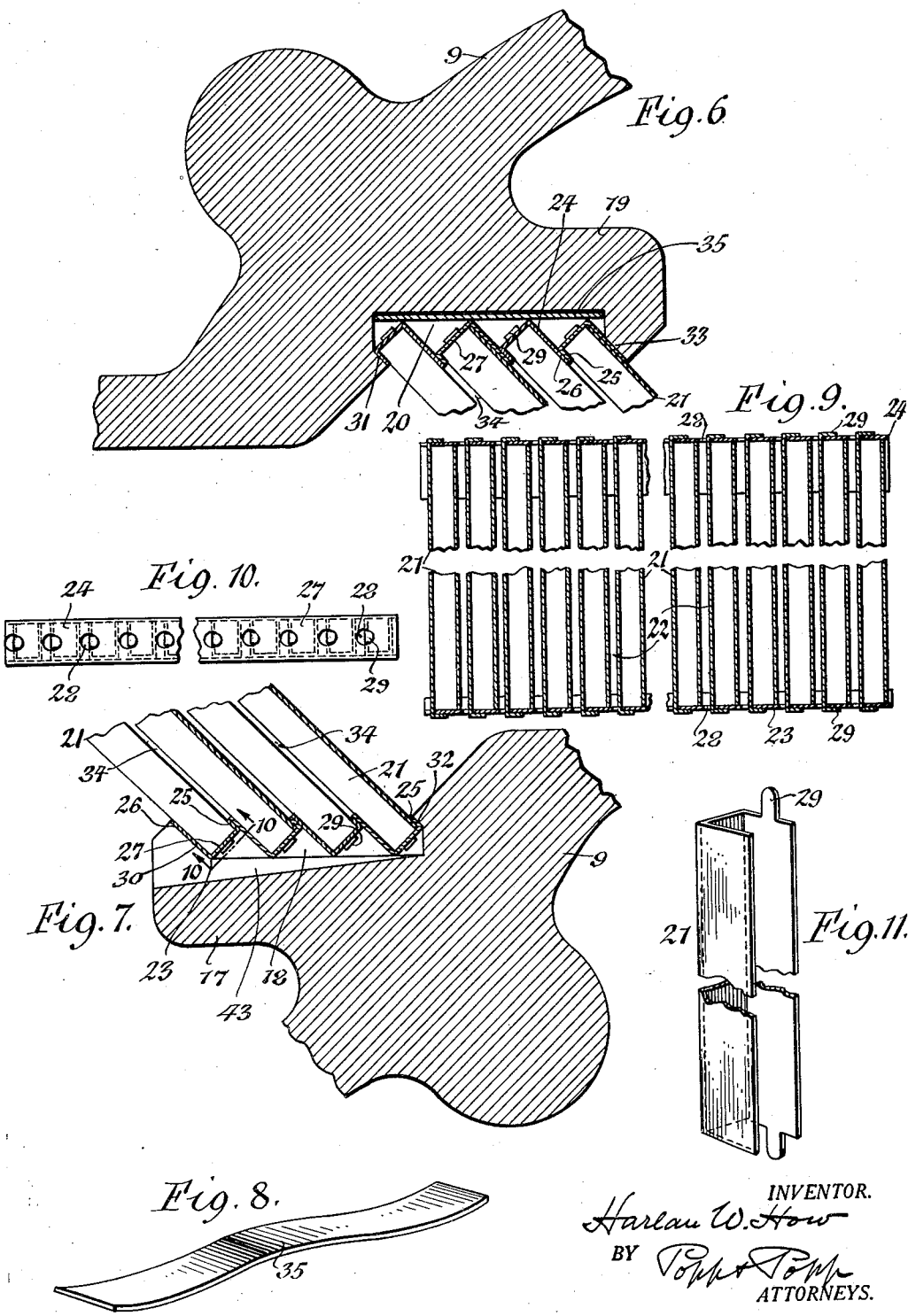

Patented June 27, 1939

2,163,600

UNITED STATES PATENT OFFICE 2,163,600

SEPARATOR

Harlan W. How, Titusville, Pa., assignor to Struthers Wells-Titusville Corporation, Titusville, Pa., a corporation of Maryland Application November 24, 1937, Serial No. 176,311

4 Claims. (Cl. 183—110)

This invention relates to a separator whereby liquid and solid particles entrained in fluids such as steam, vapor or gas are separated therefrom. An apparatus of this character is usually inserted in a steam pipe line so that steam while moving to its destination such as a prime mover, an evaporator, a dryer or other equipment will be dried and purified before being used.

One of the objects of this invention is to provide a scrubber or separator of this character which has a larger baffling area arranged in the path of the fluid which is being cleansed or dewatered and thus intercepts the passage of the fluid to a greater extent and separates the liquid and solids therein more effectively and rapidly.

Another purpose of this invention is to so organize the scrubber or separator that the same is of simple and low cost construction, capable of being readily assembled and also dismembered for convenience of inspection, cleaning or repairing and which more quickly discharges the separated liquids and solids to the exterior of the apparatus than has been possible heretofore.

In the accompanying drawings:—

Fig. 1 is a vertical longitudinal section of the scrubber or separator embodying my invention.

Fig. 2 is a horizontal section of the same taken on line 2—2, Fig. 1.

Figs. 6 and 7 are fragmentary longitudinal sections, on an enlarged scale, showing the means of supporting the scrubber sections on the lower and upper walls or parts of the scrubber chamber.

Fig. 8 is a perspective view of the spring interposed between the upper ends of the scrubber sections and the top wall of the scrubber chamber for holding these sections in place.

Fig. 9 is a fragmentary vertical section taken on line 9—9, Fig. 1, of one of the scrubber sections.

Fig. 10 is a fragmentary top plan view of the same.

Fig. 11 is a perspective view of one of the channel shaped baffles showing the condition of the same preparatory to being connected at its opposite ends with the cross bars of the respective scrubber section.

In the following description similar characters of reference indicate like parts in the several figures of the drawings.

Figure 3:
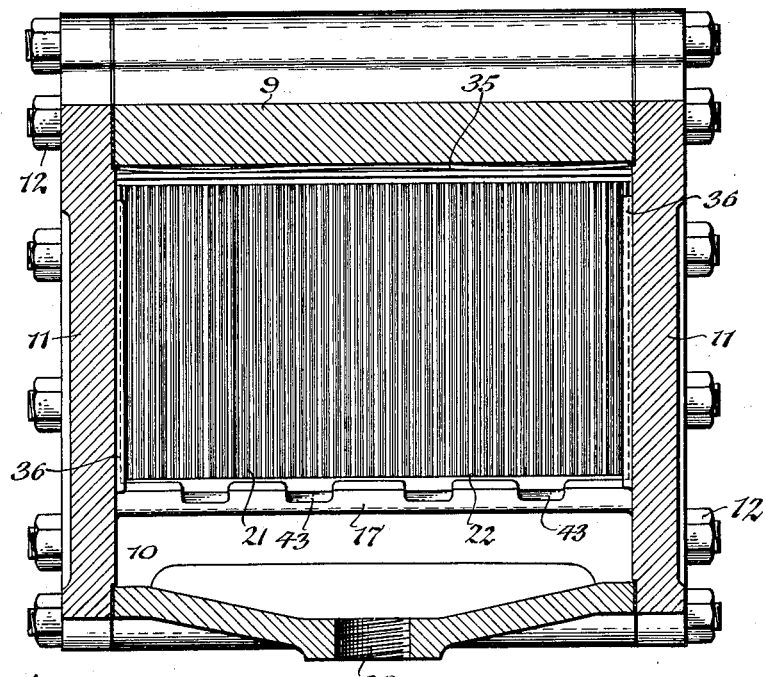
Fig. 3 is a vertical transverse section taken on line 3—3, Fig. 1.

The fluid, such as steam, vapors and gases from which any liquid or solid particles entrained therein are to be separated, passes through a scrubbing or separating chamber 10 which is preferably formed within a shell, casing or housing having a body 9 which is of cylindrical form and which has its axis arranged horizontally and transversely and two circular covers or heads 11, 11 which are detachably secured to the opposite ends of the cylindrical body by bolts 12 so as to close the lateral sides of the same.

On its front side the body is provided with a tubular inlet nozzle 13 which contains the inlet 14 through which the fluid to be treated is conducted into the front part of the scrubbing chamber, and on its rear side the body is provided with a tubular outlet nozzle 15 which contains the outlet 16 through which the treated fluid is discharged from the scrubbing chamber.

Within the scrubbing chamber are arranged the baffle means which intercept the fluid to be treated as it passes from the inlet to the outlet of this chamber and separate therefrom liquid and solids entrained therein.

These baffle means in the preferred embodiment of this invention are constructed as follows:—

On the inner side of the body of the housing adjacent to the lower part of the fluid outlet thereof is arranged a lower horizontal bracket, shelf or support 17 which is preferably formed integrally with the body and provided on its upper side with an upwardly opening guide groove or channel 18 which extends transversely of the body and forms a lower retaining seat for receiving the lower end of the fluid intercepting means. On the inner side of the housing adjacent to the upper part of the fluid inlet thereof is arranged an upper horizontal bracket or shelf 19 which is also preferably formed integrally with the body and provided on its underside with a downwardly opening guide groove or channel 20 which extends transversely and forms an upper retaining seat for receiving the upper end of the fluid intercepting means.

These fluid intercepting means comprise two or more baffle sections, elements or screens which in the preferred organization are supported in an inclined position preferably at an angle of 45 degrees within the scrubbing chamber by engaging the lower rear ends of these baffle sections with the lower grooved or channel shaped seat 18 and engaging the upper front ends of these baffle sections with the upper channel shaped seat 20. These baffle sections extend vertically across the interior of the scrubbing chamber and they also extend horizontally and transversely across the same by engaging the upright edges of these baffle sections with the inner sides of the covers or heads.

Figure 4:
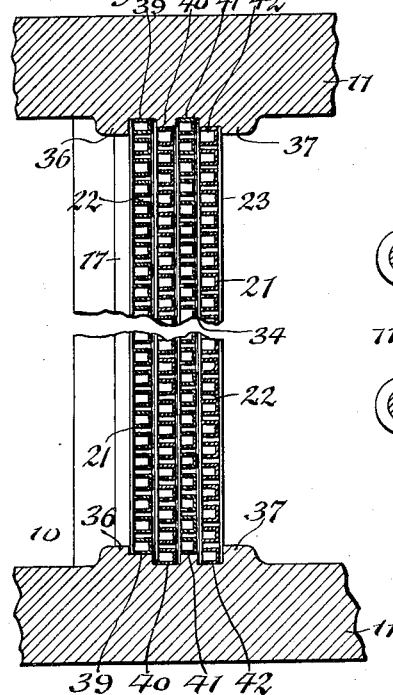
Fig. 4 is a fragmentary horizontal section, similar to Fig. 2, on an enlarged scale, taken on line 4—4, Fig. 1.
Figure 5:
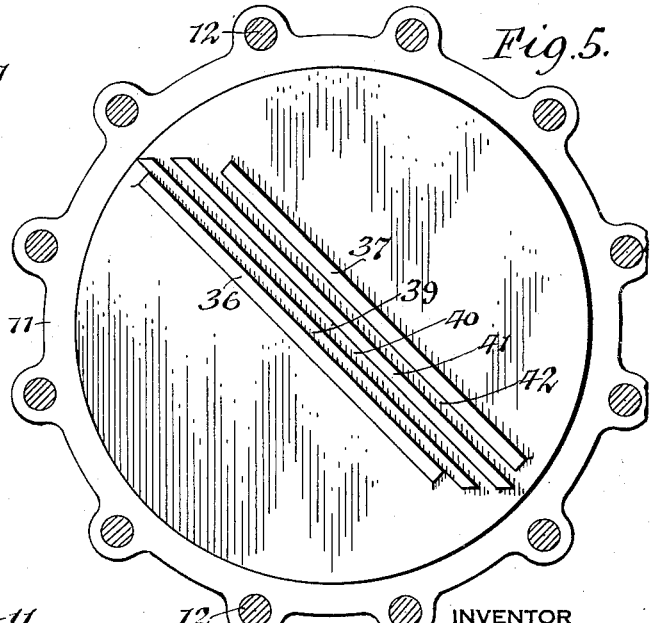
Fig. 5 is an inside view of one of the side heads of the scrubbing or separating chamber taken on line 5—5, Fig. 2.

The number of baffle sections varies in accordance with character of the fluid which is to be treated, cleansed or dewatered, or the thoroughness which is required in this operation for any particular fluid which is being treated, or to meet any other condition. In the drawings, four baffle sections are shown as this usually answers most purposes. Although these baffle sections may vary in form each of them is preferably constructed as follows:

The numeral 21 represents a plurality of upright intercepting or baffle bars, seats or troughs which are arranged in a transverse row extending from the inner side of one of the housing heads to the inner side of the other housing head, the several troughs being separated from each other so as to form vertical slots or passages 22 between adjacent troughs as shown in Figs. 2, 4 and 9. Each of these troughs is preferably constructed from a strip of sheet metal which is bent in any suitable manner and mounted in the scrubbing chamber so that the hollow or open side of the trough faces forwardly. The lower ends of the several troughs of each baffle section are connected with a lower horizontal cross bar 23 which rests on the bottom of the lower channel or seat 18 and the upper ends of these troughs are connected with an upper horizontal cross bar 24 which is arranged in the upper channel or seat 20. Each of these cross bars 23 and 24 is preferably constructed of sheet metal so that the respective bar is of U-form in cross section and forms a channel having a comparatively narrow flange 25 on one side, a comparatively wide flange 26 on its opposite side and a web 27 connecting the even outer edges of these flanges. In assembling these cross bars and troughs of each baffle section the lower ends of the troughs are inserted in one of the U-shaped cross bars with the wide and the narrow flanges of the latter arranged on the front and rear sides, respectively, of this section as shown in Fig. 7, and the upper ends of these troughs are inserted in the other of these U-shaped cross bars with the narrow and the wide flanges of the latter arranged on the front and rear sides, respectively, of this section, as shown in Fig. 6.

Various means may be employed for connecting the troughs and crossbars of each baffle section but this is preferably accomplished by providing the web of each cross bar with a longitudinal row of openings 28 and providing the opposite ends of each trough, preferably one flange thereof, with lips 29, each of which passes through an opening 28 of one of the cross bars and is bent against the outer side of the respective web, as shown in Figs. 9 and 10.

When mounting the several baffle sections in the scrubbing these sections are slid cross-wise into this chamber while at least one of the side covers or heads is removed to render this chamber accessible. During this inward movement of the baffle sections the same are inclined forwardly and engaged at their lower ends with the lower guide groove or seat 18 of the scrubbing chamber while the upper ends of the same are engaged with the upper guide groove or seat 20 thereof. When the baffle sections are thus assembled with the scrubbing chamber the adjacent sections engage one another and the lower and upper end portions of the foremost baffle section engage with the front walls 30, 31 of the lower and upper grooves or seats 18, 20, and the lower and upper edge portions of the rearmost baffle section engage with the rear walls 32, 33 of these grooves or seats, respectively, which walls are inclined parallel with the normally inclined baffle sections, as shown in Figs. 1, 6 and 7 whereby the baffle sections are firmly held against displacement under pressure when the scrubber is in operation.

The opposing flanges of the channel shaped crossbars of the several baffle sections engage with one another at the bottom and top of these sections so as to form transverse passages 34 between the set of upright baffle troughs of each baffle sections and those of an adjacent section, as shown in Figs. 1, 2, 4, 6 and 7. For the purpose of preventing vertical movement of the baffle sections, retaining means are provided which preferably consist of a wavy leaf spring 35 interposed between the upper ends of the baffle sections and the bottom of the upper retaining seat 20, as shown in Figs. 1 and 3. The resilience of this spring tends constantly to press the baffle sections downwardly so that their lower ends always bear against the bottom of the lower retaining seat 18 and thus maintain these sections in their proper operative position.

On their inner sides the lateral covers or heads of the housing are provided with incline grooves which receive the upright edges of the set of baffle sections, each of these grooves being formed between front and rear ribs 36, 37 arranged on the inner side of the respective head and bearing against the front side of the foremost baffle section and the rear side of the rearmost section of the group of baffle sections and thus holding the same at their side parts.

After the steam or other fluid to be dried and purified enters the scrubbing or separating chamber it successively encounters the series of baffle sections whereby the course of the steam is alternately changed several times before emerging from this chamber by impinging against the intercepting troughs and thereby causes a whipping action on the steam which throws out the water or impurities therein. The water and impurities drain down the troughs of the baffle sections to the bottom of the scrubbing chamber and the steam emerges from the outlet of the latter with practically no entrained moisture or solids.

In order to so position each baffle section that the same intercepts the stream of fluid as it passes through the scrubbing chamber and also cause the several sections to successively intercept this fluid stream, these sections are so mounted in the scrubbing chamber that the upright intercepting troughs 21 of each baffle section are arranged opposite the vertical slots or passages 22 of the adjacent baffle section, as shown in Figs. 2 and 4. By this arrangement some parts of the stream of fluid passing from the front end to the rear end of the scrubbing chamber will impinge on the intercepting troughs of the foremost baffle section and will be deflected practically ninety degrees from its course while other parts of this stream will pass through the vertical slots between the troughs of the first baffle section. The fluid deflected by the first intercepting troughs joins the parts of the stream which pass through the slots of the first baffle section and then these combined parts of the stream of fluid impinge against the intercepting troughs of the second baffle section and are again deflected at right angles therefrom. The fluid deflected by these second intercepting troughs passes rearwardly through the slots between the troughs of the second baffle section and strikes the intercepting troughs of the third baffle section and is deflected laterally by the same. In like manner the fluid deflected from the troughs of the third baffle section passes through the slots between the same, then strikes the troughs of the fourth baffle section and after being deflected by the same passes through the slots between the last mentioned baffle section into the rear part of the scrubbing chamber.

It follows from this movement of the fluid that the same takes a tortuous or zig-zag course as it is successively intercepted and whipped by the troughs of the several baffle sections. As the fluid stream impinges on the intercepting troughs more or less of the liquid and solids entrained therein are separated therefrom and deposited on the surface of the troughs while the clarified fluid passes on. The separated liquid and solids deposited on the troughs run down the front sides of the latter in the retaining groove 18 of the lower supporting shelf 17 and thence flow forwardly from the latter upon the bottom of the scrubbing chamber and escape through a liquid and solids discharge opening 38 in this bottom to the exterior of the apparatus. A steam trap or similar device is connected with this opening to permit the liquid removed to escape but holds back the steam or other fluid which has been dried or clarified.

In order to permit the liquid falling into the lower retaining groove 18 to escape freely therefrom into the scrubbing chamber the shelf 17 is provided with a plurality of drain channels 43 which are formed in the bottom of the lower retaining groove or seat 18 and extend forwardly through the front wall thereof, as shown in Figs. 3 and 7.

To facilitate the placement of the baffle sections in the scrubbing chamber so that the intercepting troughs of each section will always be opposite the slots between the troughs of an adjacent section, the bottoms of the retaining grooves in the heads are provided with corresponding pairs of spacing shoulders 39, 40, 41, 42 which are engaged by the opposite upright edges of the several baffle sections for holding the latter in the proper relative position in the scrubbing chamber. As clearly appears in Figs. 2 and 4, the several pairs of spacing shoulders of the two housing heads are staggered or off-set relative to each other in a direction lengthwise of the scrubbing chamber so that when each baffle section engages its upright edges with the respective spacing shoulders the intercepting troughs of this section will be arranged opposite the slots of an adjacent baffle section and thus compel the fluid to take the zig-zag path in traversing the several sections of the baffle means.

Due to the inclination of the intercepting troughs of the baffle sections a larger effective baffle area is obtained for a given space than is possible when the baffles are arranged vertically or perpendicular to the path of the fluid which is being treated.

Moreover the inclination of the baffles relative to the main line of movement of the fluid through the scrubbing chamber causes the water and solids which are deposited on the intercepting troughs as the fluid impinges on the same to diverge from the fluid and slide at an angle down the troughs and have less tendency to bounce off said troughs as is customary in this type of equipment heretofore in use. As the steam travels through the baffle means in a horizontal direction it actually assists the separated water and solids to run down the front side of the baffle and drain off more rapidly and perfectly than would otherwise be possible and thus increases the efficiency of the apparatus.

By so constructing the channel shaped cross bars of the baffle sections that one flange thereof is narrow and the other comparatively wide it is possible for the opposing flanges of these sections to engage each other for spacing the sections apart in the inclined operative position of these sections and still make these cross bars of a minimum of metal and provide the fullest length of clearance slots between the intercepting troughs.

As a whole this apparatus is comparatively simple in construction and capable of being manufactured at low cost and its working parts are readily accessible for inspection, cleaning and repairing.

I claim as my invention:

1. A fluid scrubber comprising a scrubbing chamber having a fluid inlet and a fluid outlet on its horizontally opposite sides, a channel shaped lower seat arranged within said scrubbing chamber transversely adjacent to the lower part of said outlet and a channel shaped upper seat arranged transversely adjacent to the upper part of said inlet, and an inclined baffle arranged in said chamber between said inlet and outlet and engaging its lower end with said lower seat and its upper end with said upper seat and said lower channel seat being provided with drain passages leading to the inner edge of the same within said scrubbing chamber.

2. A fluid scrubber comprising a scrubbing chamber having a fluid inlet in its front part, a fluid outlet in its rear part, and a plurality of locating shoulders on the inner sides of its longitudinal walls, the corresponding members of each pair of shoulders being arranged respectively on these walls and the distance between each pair being equal to the distance between the members of an adjacent pair, and a plurality of baffle sections of equal width arranged in said chamber between said inlet and outlet, each section having its opposite upright edges engaging with the corresponding members of a pair of said shoulders and provided with a transverse row of upright troughs which are arranged opposite the upright spaces between the troughs of an adjacent baffle section.

3. A fluid scrubber comprising a scrubbing chamber having a fluid inlet and a fluid outlet on horizontally opposite ends, a lower bracket arranged within said scrubbing chamber adjacent to the lower part of said outlet and having a transverse retaining groove and a draining channel formed in the bottom of said groove and extending through the front wall thereof, an upper bracket arranged adjacent to the upper part of said inlet into the interior of said scrubbing chamber and a baffle arranged in said chamber and having its lower and upper ends seated in the grooves of said lower and upper brackets.

4. A fluid scrubber comprising a scrubbing chamber having a fluid inlet and a fluid outlet on horizontally opposite ends, a lower bracket arranged adjacent to the lower part of said outlet and having a seat, an upper bracket arranged adjacent to the upper part of said inlet and having a seat, and a plurality of baffle sections arranged side by side in an inclined position lengthwise of said scrubbing chamber and engaging their lower and upper ends with said lower and upper seats, and each baffle section including a plurality of upright intercepting bars arranged in a transverse row and lower and upper horizontal cross bars connecting the lower and upper ends, respectively, of said upright intercepting bar, each of said cross bars being of U-shape in cross section providing front and rear flanges which receive one of the corresponding ends of the intercepting bars between them, and each lower cross bar having its wide and narrow flanges arranged respectively on the front and rear sides of the same and each upper cross bar having its narrow and wide flanges arranged, respectively, on the front and rear sides of the same, and adjacent cross bars having their narrow and wide flanges engaging one another.

HARLAN W. HOW.